US009860745B2

(12) United States Patent
Abraham et al.

(10) Patent No.: US 9,860,745 B2
(45) Date of Patent: Jan. 2, 2018

(54) METHODS AND APPARATUSES FOR NAN DATA LINK GROUP FORMATION AND DATA FRAME ADDRESS SETTINGS

(71) Applicant: QUALCOMM Incorporated, San Diego, CA (US)

(72) Inventors: Santosh Paul Abraham, San Diego, CA (US); Abhishek Pramod Patil, San Diego, CA (US); George Cherian, San Diego, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 15/043,407

(22) Filed: Feb. 12, 2016

(65) Prior Publication Data

US 2016/0249208 A1    Aug. 25, 2016

Related U.S. Application Data

(60) Provisional application No. 62/119,717, filed on Feb. 23, 2015.

(51) Int. Cl.
| | |
|---|---|
| *H04K 1/00* | (2006.01) |
| *H04W 12/04* | (2009.01) |
| *H04W 8/26* | (2009.01) |
| *H04W 72/04* | (2009.01) |
| *H04L 9/14* | (2006.01) |

(Continued)

(52) U.S. Cl.
CPC .............. *H04W 12/04* (2013.01); *H04L 9/14* (2013.01); *H04L 61/2038* (2013.01); *H04L 61/2069* (2013.01); *H04W 8/26* (2013.01); *H04W 12/02* (2013.01); *H04W 72/0453* (2013.01); *H04L 61/6022* (2013.01); *H04L 63/0428* (2013.01); *H04L 63/065* (2013.01);

(Continued)

(58) Field of Classification Search
USPC .......................................................... 380/270
See application file for complete search history.

(56) References Cited

U.S. PATENT DOCUMENTS

| | | | | |
|---|---|---|---|---|
| 7,522,908 B2* | 4/2009 | Hrastar | ................. | H04W 24/00 370/242 |
| 8,578,450 B2* | 11/2013 | Ou | ........................ | H04L 51/38 726/4 |

(Continued)

OTHER PUBLICATIONS

International Search Report and Written Opinion—PCT/US2016/018103—ISA/EPO—dated Apr. 13, 2016.

*Primary Examiner* — Amare F Tabor

(74) *Attorney, Agent, or Firm* — Knobbe, Martens, Olson

(57) ABSTRACT

Systems and methods for communication in a wireless network are disclosed. In one aspect, a method includes generating a medium access control (MAC) address for a first group of wireless devices, storing the MAC address for the first group of wireless devices in an address field of a first message, and transmitting, by a first wireless device of the first group of wireless devices, the first message to a second wireless device of the first group of wireless devices. In some aspects, the wireless network comprises a neighbor aware network (NAN). In some aspects, a wireless device may be able to determine a method of encryption or decryption for the first message based at least in part on the MAC address for the first group of wireless devices.

20 Claims, 6 Drawing Sheets

(51) Int. Cl.
*H04W 12/02* (2009.01)
*H04L 29/12* (2006.01)
*H04W 84/18* (2009.01)
*H04L 29/06* (2006.01)

(52) U.S. Cl.
CPC .......... *H04L 63/0876* (2013.01); *H04L 63/18* (2013.01); *H04L 2209/24* (2013.01); *H04W 84/18* (2013.01)

(56) References Cited

U.S. PATENT DOCUMENTS

| | | | |
|---|---|---|---|
| 2008/0022115 A1* | 1/2008 | Mock .................... | G06Q 10/00 713/178 |
| 2010/0165875 A1* | 7/2010 | Kneckt ................. | H04W 84/18 370/254 |
| 2012/0230242 A1* | 9/2012 | Kim .................... | H04B 7/0452 370/312 |
| 2013/0070601 A1* | 3/2013 | Shen .................... | H04W 28/08 370/236 |
| 2013/0094367 A1* | 4/2013 | Zou ..................... | H04L 12/189 370/241 |
| 2014/0133495 A1* | 5/2014 | Viger ................. | H04W 74/0816 370/442 |
| 2014/0302786 A1* | 10/2014 | Kasslin ................ | H04W 8/005 455/41.2 |
| 2014/0313966 A1 | 10/2014 | Shukla et al. | |
| 2014/0355763 A1 | 12/2014 | Lee et al. | |
| 2014/0376519 A1 | 12/2014 | Yang et al. | |
| 2015/0139217 A1* | 5/2015 | Qi ....................... | H04W 56/001 370/350 |

\* cited by examiner

METHODS AND APPARATUSES FOR NAN DATA LINK GROUP FORMATION AND DATA FRAME ADDRESS SETTINGS

CROSS REFERENCE TO PRIORITY APPLICATION

This application claims priority under 35 U.S.C. §119(e) to U.S. Provisional Pat. App. 62/119,717 entitled "METHODS AND APPARATUSES FOR NAN DATA LINK GROUP FORMATION AND DATA FRAME ADDRESS SETTINGS" filed on Feb. 23, 2015, the disclosure of which is hereby incorporated by reference in its entirety.

BACKGROUND

Technological Field

The present disclosure is generally related to neighbor-aware networking and more particularly to systems, methods, and devices for forming neighbor-aware or social Wi-Fi network groups and communication within neighbor-aware or social Wi-Fi network groups.

Description of the Related Art

In many telecommunication systems, communications networks are used to exchange messages among several interacting spatially-separated devices.

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

One or more devices in a wireless network may be configured to provide services. For example, a device may include hardware, such as a sensor, that is used to capture data. An application running on the device may then use the captured data to perform an operation. In some cases, the captured data may be useful to other devices in the wireless network. Some of the other devices in the wireless network may include similar hardware so as to capture similar data. Alternatively, the device could provide these services (e.g., the captured data) to one or more other devices in the wireless network. The device may inform the one or more other devices in the wireless network of the services that the device provides by advertising this information over the wireless network. Other devices may further advertise the services provided by a device to other devices not within range or capable of direct communication with the service provider.

SUMMARY OF THE INVENTION

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of the various embodiments of this invention provide advantages that include improved controlling of touchscreen interferences in wireless power systems.

One aspect disclosed is a method of communication in a wireless network. The method comprises generating a medium access control (MAC) address for a first group of wireless devices and storing the MAC address for the first group of wireless devices in an address field of a first message. The method further comprises transmitting, by a first wireless device of the first group of wireless devices, the first message to a second wireless device of the first group of wireless devices.

Another aspect disclosed is a wireless device for communicating in a wireless network. The wireless device comprises a processor configured to generate a medium access control (MAC) address for a first group of wireless devices, and store the MAC address for the first group of wireless devices in an address field of a first message. The wireless device further comprises a transmitter configured to transmit the first message to a second wireless device of the first group of wireless devices.

Another aspect disclosed is a non-transitory computer readable storage medium comprising instructions that when executed cause a processor to perform a method of communication in a wireless network. The method comprises generating a medium access control (MAC) address for a first group of wireless devices and storing the MAC address for the first group of wireless devices in an address field of a first message. The method further comprises transmitting the first message to a second wireless device of the first group of wireless devices.

Another aspect disclosed is a wireless device for communicating in a wireless network. The wireless device comprises means for generating a medium access control (MAC) address for a first group of wireless devices and means for storing the MAC address for the first group of wireless devices in an address field of a first message. The wireless device further comprises means for transmitting the first message to a second wireless device of the first group of wireless devices.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
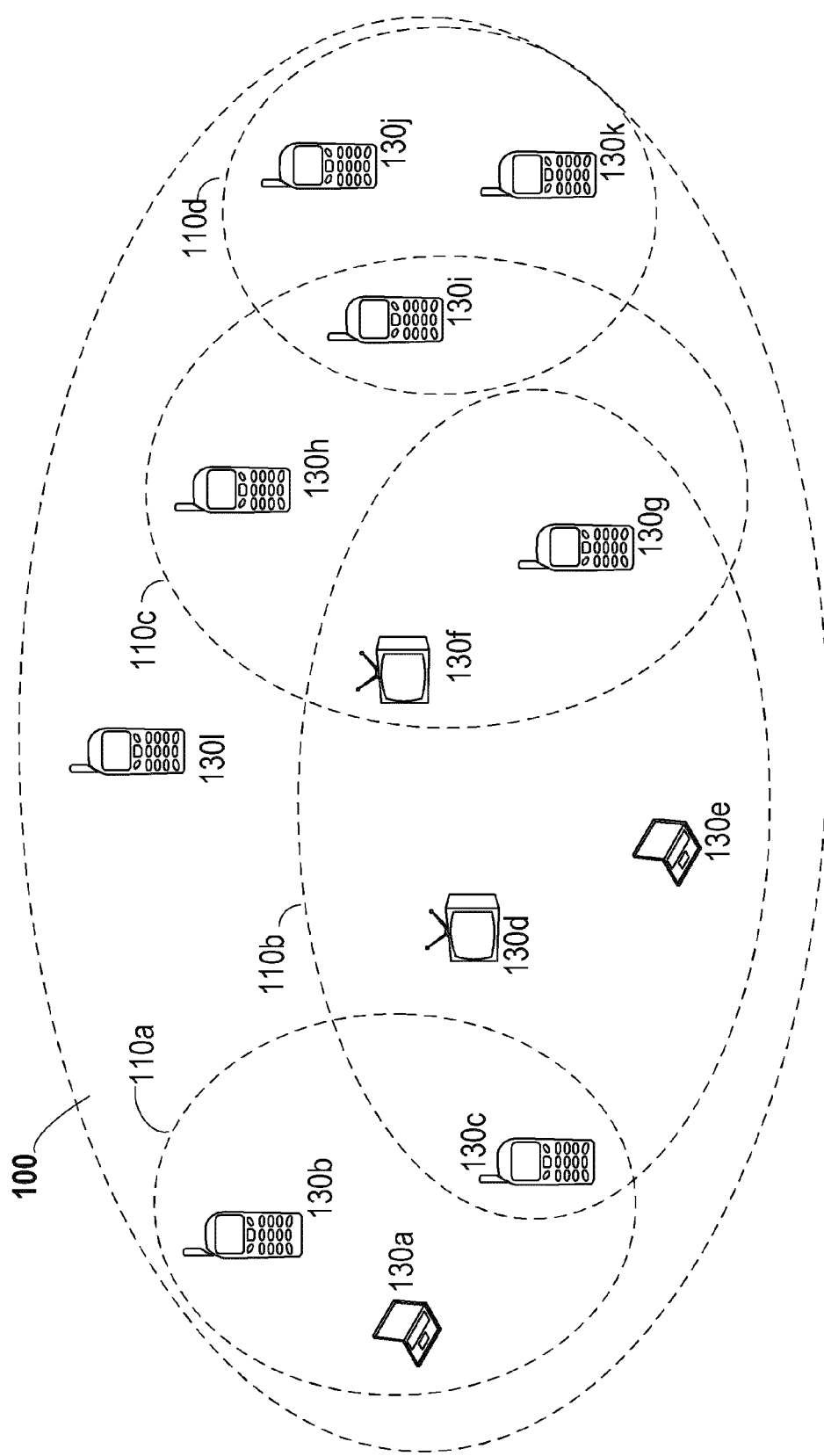
FIG. 1 illustrates an example of a wireless network, according to the disclosure.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Based on the teachings herein one skilled in the art should appreciate that the scope of the disclosure is intended to cover any aspect of the novel systems, apparatuses, and methods disclosed herein, whether implemented independently of, or combined with, any other aspect of the invention. Although some benefits and advantages of the preferred aspects are mentioned, the scope of the disclosure is not intended to be limited to particular benefits, uses, or objectives.

Popular wireless network technologies may include various types of wireless local area networks (WLANs). A WLAN may be used to interconnect nearby devices together, employing widely used networking protocols. The various aspects described herein may apply to any communication standard, such as a wireless protocol. In some implementations, a wireless local area network (WLAN) includes various devices that are the components that access the wireless network. For example, there may be two types of devices: access points ("APs") and clients (also referred to as stations, or "STAs"). In general, an AP may serve as a hub or base station for the WLAN and a STA serves as a user of the WLAN. In some implementations an STA may also be used as an AP.

An AP may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology. A STA may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The 802.11s standard defines how wireless devices may communicate via mesh networks. Mesh networks may be used for static topologies and ad-hoc or neighbor aware networks (NAN). The terms "Social Wi-Fi," (SWF) and "NAN" are used interchangeably herein. A network may comprise a plurality of mesh devices, each of which is capable of relaying data within the network on behalf of other mesh devices in a SWF environment. The data transmitted or relayed between the mesh devices may similarly create a data link ("DL") wherein the "link" describes the data flow from one mesh device to another. Accordingly, a SWF mesh may also be referred to as a NAN data link (NDL), comprising data transferred from a service provider to a service consumer, as described below. As described herein, a mesh may be generally referred to as comprising a plurality of DLs, although the two terms may be interchanged. A NDL may include more than one "hop." A "hop" as used herein depends on the number of mesh devices between the device providing the service (provider device) and the device consuming the service or "subscribing" (subscriber device) to the service in the mesh network.

In various contemplated embodiments, a "mesh network group" or an "NDL group" is used. Accordingly, the devices that make up a mesh network may be the same as the devices that form an NDL group. The devices that make up an NDL group may be a subset of a NAN cluster that shares a paging window (PW). The PW for the NDL group may have common security credentials for each of the participating devices, which may serve to restrict membership within the NDL group. Accordingly, a restricted NDL group may require out-of-band credentialing.

The STAs within a mesh network may wish to form NDL groups in order to communicate with each other in a simple and secure manner. In some NANs, a STA may also wish to be part of more than one NDL group. If the STA is a member of two groups, for instance, the STA may receive communications from other STAs that are members of the first NDL group, the second NDL group, or both. Accordingly, the STA may wish to identify which NDL group a received communication is associated with. Further, the STA may wish to identify which NDL group a transmitted communication is associated with. Additionally, the members of a NDL group may wish to encrypt their communications so that only members of the NDL group may decipher and read the communication. However, without a method of easily identifying which NDL group a communication is associated with, there may be difficulties in encrypting or decrypting the communication. Thus, forming NDL groups and providing a method of data transfer among the devices of the NDL group may provide simple and secure communications within NDL groups, especially when STAs are participants of more than one NDL group. This may require the generation of a MAC address for each NDL group.

Referring to FIG. 1, a particular illustrative embodiment of a wireless network is depicted and generally designated 100. In some aspects, the wireless network 100 is a NAN. A NAN may also be referred to as an ad-hoc network in this disclosure. FIG. 1 illustrates wireless devices 130a-130l (collectively referred to herein as the wireless devices 130) are participating in the wireless network 100. Wireless devices 130 may also be referred to as "mobile" devices. For example, each of the wireless devices 130 may receive beacon or other time synchronization information from one of the other wireless devices 130 within the wireless network 100. This information may be received through a multi-hop data link as described above. In at least one aspect, one of wireless devices 130 may be designated as a "root" node for the wireless network 100, and therefore periodically transmit synchronization messages that are received by each of the other wireless devices 130. For example, the wireless device 130a may be the first wireless device 130 to provide a first service, thus it may be referred to as the service initiator device, and may also be the "root" device responsible for the synchronization messages within a particular mesh or NDL group, e.g., NDL group 110a.

The service initiator device may have an associated MAC address, which may be used in a method of generating a MAC address for the NDL group (described below). The service initiator device may also keep track of an indication of a time at which the NDL group is formed. The indication of the time may also be used in a method of generating a MAC address for the NDL group (described below). This indication of the time may be a timestamp or some other value. In one embodiment, the service initiator device is responsible for generating the MAC address for the NDL group. Thus, the service initiator may be responsible for forming an NDL group 110. In other embodiments, another device or process is responsible for generating the MAC address for the NDL group. Responsibilities as the root device (e.g., one of the wireless devices 130) may change periodically as the membership of the wireless network 100 changes. In some aspects, one or more of the wireless devices 130 may be considered stations (STA).

As shown, the wireless network 100 also may include four NDL groups 110a-110d, referred to collectively as the "NDL groups 110." NDL groups may also be referred to herein as mesh networks or simply as "NDLs." Each of the NDL groups 110 is shown including a portion of the wireless devices 130a-130k. The NDL group 110a includes wireless devices 130a-130c. The NDL group 110b includes wireless devices 130c-130g. The NDL group 110c includes wireless devices 130f-130i. The NDL group 110d includes wireless devices 130i-130k. As shown, the wireless device 130l is not currently included in any of NDL groups 110, however wireless device 130l may join an NDL as needed to subscribe to a desired service. In certain embodiments, some of the NDL groups 110 may be formed according to the service or services provided by the member(s) (wireless devices 130) of the respective NDL groups 110. In some embodiments, an NDL group 110 may be formed at the start of an instance of a service (e.g., when a service initiator device first provides the service within the NAN). This formation process may be referred to herein as "spontaneous group formation" (described more fully in connection with FIG. 3). In other embodiments, an NDL group 110 may be formed out of the scope of the NAN by an out of band procedure. This formation process may be referred to herein as "out of band group formation" (described more fully in connection with FIG. 3). In certain embodiments, each NDL group 110 may include a plurality of multi-hop data links among the wireless devices 130.

Communication within each of the NDL groups 110 may be performed on a different communication channel than other communication for wireless network 100. For example, each of NDL groups 110 may operate on a different communication channel, which is also different than the channel used to perform communication for the wireless network 100. Additionally or alternatively, each of the members of the NDL groups 110 may communicate through the use of a different MAC address associated with each of the respective NDL groups 110. In this instance, a recipient of the communications may be able to determine which NDL group 110 the communication is associated with (e.g., wireless device 130g may be able to determine that a communication from wireless device 130f is associated with NDL group 110b, as opposed to NDL group 110c). In one embodiment, the MAC address for the NDL group 110 is transmitted in the Address 1 field of an 802.11 MAC protocol data unit (MPDU).

Each of the NDL groups 110 may be utilized by one or more "provider devices" to provide a service to other member devices of the NDL groups 110. For example, the wireless device 130a may be a service providing device (provider device) for the NDL group 110a, which, in one example, provides a music service to wireless devices 130b-130c. The wireless device 130a may advertise the service being provided on the NDL group 110a to devices on wireless network 100. For example, wireless device 130a (or other provider devices on wireless network 100) may broadcast or multicast a message over the wireless network 100 indicating a service that can be provided and one or more parameters associated with obtaining the service. In addition, a provider device on wireless network 100 may respond to service discovery requests received from other potential subscriber devices on the wireless network 100 as described above. For example, wireless device 130a may be a provider device that transmits a discovery response that includes information indicating the service being provided in the NDL group 110a.

Similarly, each of the NDL groups 110b-110d may also comprise a respective provider device that may operate similarly to the example of the wireless device 130a of the NDL group 110a provided above. For example, the wireless device 130d may be the provider device for NDL group 110b, offering a video game service to wireless devices 130c, 130e, 130f, and 130g. The wireless device 130h may be a provider device for the NDL group 110c by providing a picture sharing service to wireless devices 130f, 130g, and 130i. Similarly, wireless device 130j may be a provider device which may provide a video service over the NDL group 110d to wireless devices 130i and 130k. Accordingly, each of the wireless devices 130 that consumes or subscribes to the services of a given provider device (e.g., wireless devices 130a, 130d, 130h, 130j) may also be referred to as a subscriber device. More particularly, in view of the provider devices (e.g., 130a, 130d, 130h, 130j) noted above, a "subscriber device" may generally refer to the wireless devices 130b, 130c, 130e, 130f, 130g, 130i. However, in certain aspects, a wireless device 130a-130k may be classified as either a "provider device" or a "subscriber device" depending on the service architecture.

A given mobile device may be a member of two or more NDL groups 110 concurrently and therefore receive services provided by each of the provider devices or provide services received by each of the subscriber devices of the respective NDL groups 110. For example, the wireless device 130c is shown as a member of both NDL groups 110a and 110b. Thus, wireless device 130c may be concurrently receiving the music services provided by wireless device 130a and image services provided by wireless device 130d. Similarly, wireless devices 130f-g participate in NDL groups 110b and 110c, and wireless device 130i participates in both NDL groups 110c and 110d.

FIG. 1 illustrates that a wireless device providing a service over one NDL group may also receive services over a second NDL group. For example, in FIG. 1, the wireless device 130c may be receiving music services via NDL group 110a while providing a video game service to wireless devices 130d-g. In an embodiment, a single wireless device 130 may provide multiple services to multiple NDL groups. For example, wireless device 130c may provide a service for music in NDL group 110a to wireless devices 130a-b while simultaneously providing a service for video games in NDL group 110b to wireless devices 130d-g.

As described above, a mobile device (e.g., wireless devices 130f or wireless device 130g) that is a participant of more than one NDL group (e.g., NDL group 110b or NDL group 110c) may wish to determine which NDL group a received communication is associated with. This same desire may be present in mobile devices that are only participants of one NDL group (e.g., wireless device 130b of NDL group 110a). Accordingly, methods of forming NDL groups as well as methods of communicating within the NDL groups are described herein. These methods may involve forming an NDL group through spontaneous group formation, out of band group formation, or some other method of NDL group formation known in the art. Upon formation, or sometime thereafter, a MAC address for the NDL group may be generated. This MAC address may be based on a variety of factors that make the MAC address unique within the NAN or some subset thereof. This MAC address may be stored in every communication between/among the wireless devices of an NDL group. The various communications or messages and their implementation are described below in connection with FIGS. 3-6.

Figure 2:
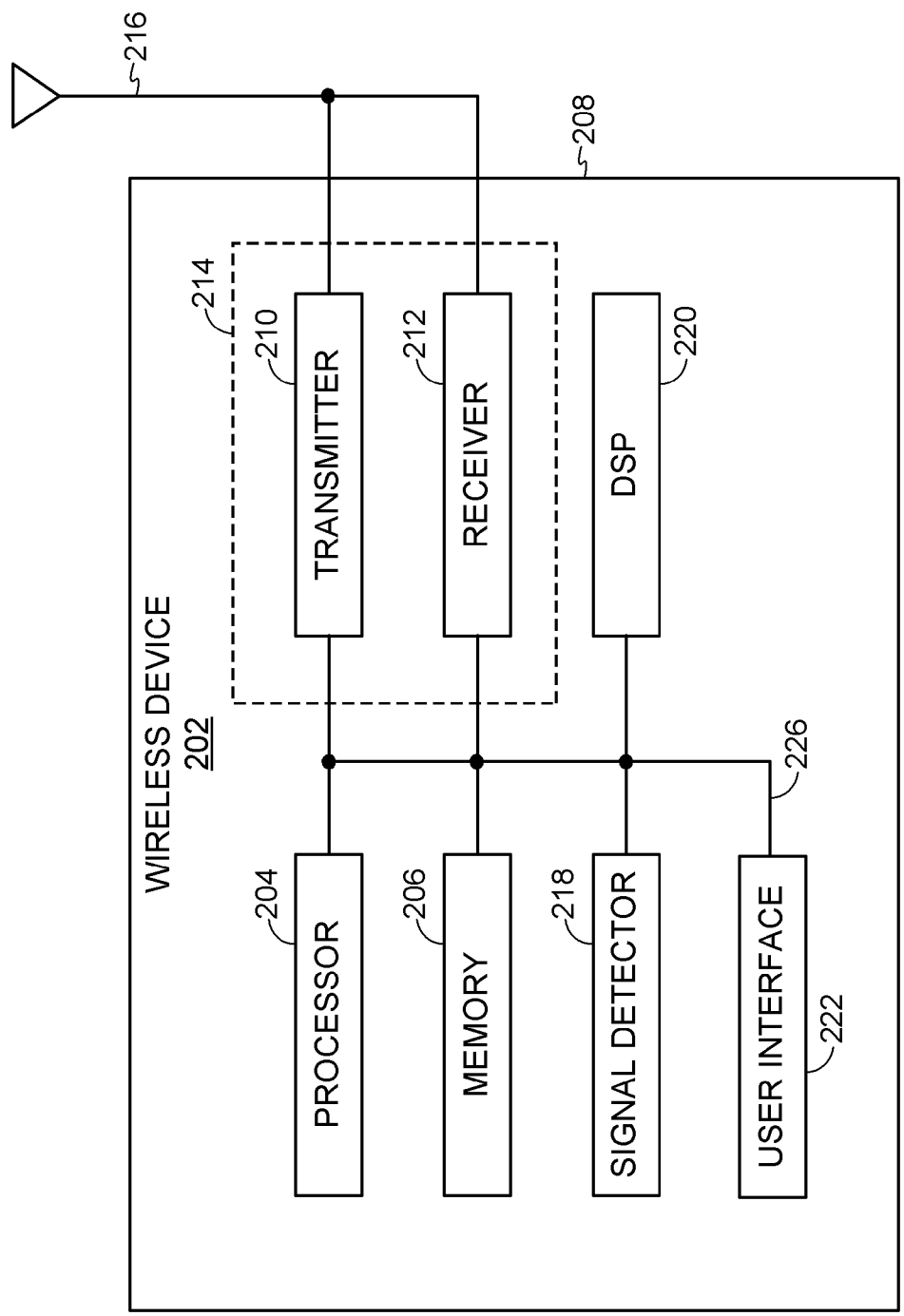
FIG. 2 illustrates an exemplary functional block diagram of a wireless device that may be employed within the wireless network of FIG. 1, according to the disclosure.

FIG. 2 shows an exemplary functional block diagram of a wireless device 202 that may be employed within the wireless network 100 of FIG. 1. The wireless device 202 is an example of a device that may be configured to implement the various methods described herein. For example, the wireless device 202 may comprise one of the wireless devices 130a-1.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer convergence protocol (PLCP) data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise any of wireless devices 130a-1, and may be used to transmit and/or receive communications. That is, any of wireless devices 130a-1 may serve as transmitter or receiver devices. Certain aspects contemplate a signal detector 218 being used by software running on memory 206 and processor 204 to detect the presence of a transmitter or receiver.

As described above, a wireless device, such as wireless device 202, may be configured to provide services, receive services, or otherwise communicate within a wireless communication system, such as the wireless network 100. For example, the wireless device 202 may include hardware (e.g., a sensor, a global positioning system (GPS), etc.) that is used to capture or calculate data (e.g., sensor measurements, location coordinates, etc.).

As discussed in the following figures, the disclosed methods and systems extend the capabilities of existing social Wi-Fi frameworks such as wireless network 100 to enable participating devices, such as wireless devices 130, to form NDL groups, and to communicate simply and securely within the NDL groups. To accomplish this, a set of parameters used to establish an NDL group comprising the wireless devices 130 may be defined. These parameters may also be used when communicating between the wireless devices 130 of the NDL groups 110, as discussed below with respect to FIG. 4. In some aspects, this set of parameters may be multicast or broadcast over the NAN, being included in one or more of the beacon transmissions, service advertisements, or other similar transmissions that may apprise a wireless device 130 of services available from a given NDL group 110. In one embodiment, these parameters are included within an 802.11 MPDU.

Once the NDL is established by participating wireless devices 130, the service may be delivered to the devices of the NDL. In some aspects, wireless devices 130 may subscribe or be participants of multiple mesh networks, as noted above to provide for the delivery of multiple services to the devices (e.g., wireless devices 130c, 130f). Similarly, the wireless devices 130 may subscribe to more than one service and thus be members of more than one mesh network or mesh network group. Therefore, connectivity attributed for a given mesh network or multiple mesh networks may be advertised on a per-service basis. The communications associated with such wireless devices 130 of NDL groups may be substantially similar to the methods and systems described below with respect to the following figures.

The methods and systems disclosed herein may utilize one or more communication parameters that function to define an NDL group within which a particular service is provided. These parameters assist a participating wireless device 130 in identifying communications associated with the appropriate NDL group 110 for service delivery, as they may uniquely identify an NDL group. These parameters may also assist a participating wireless device 130 in decrypting messages associated with differing NDL groups, which may require differing encryption credentials, as discussed below. By forming NDL groups and establishing a method of communication and a method of encryption thereof, operational efficiencies may be achieved in some aspects.

Figure 3:
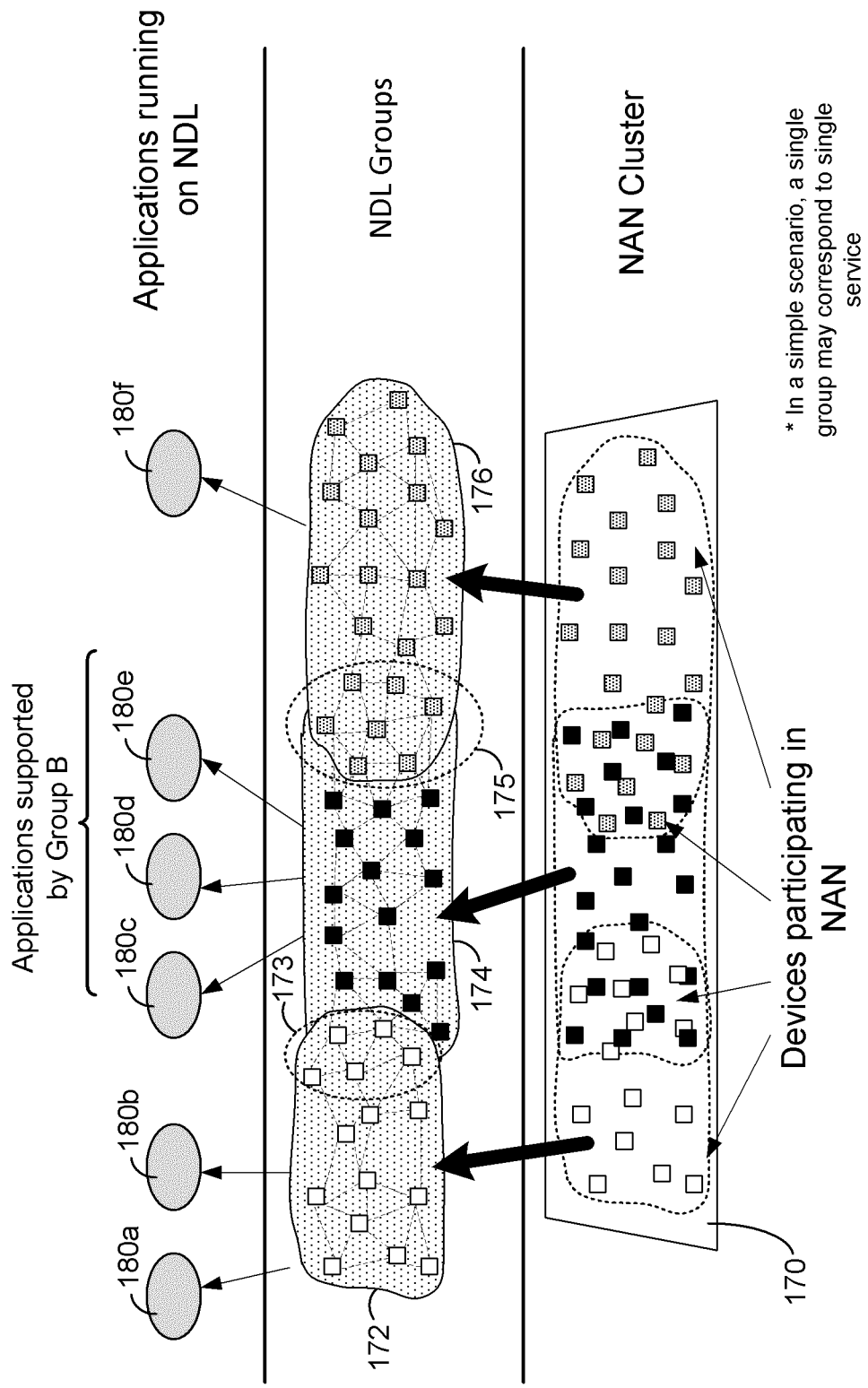
FIG. 3 depicts an illustrative embodiment of a neighbor aware network having multiple neighbor aware network data link groups, in accordance with the disclosure.

FIG. 3 depicts an illustrative embodiment of a NAN according to the disclosure. As shown, a plurality of devices within a cluster 170 are participating in the SWF NAN. The cluster 170, or SWF NAN, shown in this figure may be similar to the wireless network 100 (FIG. 1). The plurality of devices within the cluster 170 may further be similar to the wireless devices 130. In an embodiment, each of the devices within the cluster 170 may be using a service or services offered by the members of the NAN as a whole. In some other embodiments, the service(s) may also be delineated by smaller groups within the cluster 170. The smaller groups may be referred to herein as NDL groups: a NDL group 172, a NDL group 174, or a NDL group 176. Accordingly, a given NAN (e.g., the cluster 170) may comprise multiple NDLs, or NDL groups as described herein. Each of the NDL groups 172, 174, 176 may include a plurality of multi-hop data links among the devices, as depicted in the figure. Each of the respective NDLs (the NDL group 172, the NDL group 174, and the NDL group 176) may comprise a common service, a common operating system, a common platform (e.g., a particular brand of smartphone, or computer), or other relevant commonality. Each of the NDL groups 172, 174, 176 may then comprise an individual NDL group. As a non-limiting example, the NDL group 172 may form a SWF mesh for transport of data, while the NDL group 174 may utilize GPS services, video/photo sharing, or online gaming features. In some embodiments, there may be an identifier associated with the cluster 170, an identifier associated with each service offered by the members of the cluster 170, or both. These identifiers may be used in the creation of a MAC address associated with each of the NDL groups 172, 174, 176.

In an embodiment, the cluster 170 and the devices of the NDL groups 172, 174, 176 may be capable of supporting multiple services each. Within each NAN, or within each of the NDL groups 172, 174, 176 (within the NAN), each device may become a proxy for services provided by the respective devices of the NDL group or the NAN. In an embodiment, where an NDL group (e.g., the NDL groups 172, 174, 176) supports one or more services, all of the participating wireless devices 130 of the NDL group may proxy the services provided within the NDL group regardless of whether the individual proxy STA is actually consuming the service.

In an embodiment, a further abstraction may be implemented, delineating what particular applications 180 might be supported within a particular NDL group. In an embodiment, the STAs that are part of the NDL groups 172, 174, 176 (i.e., participating in the respective Social Wi-Fi mesh) may normally act as a proxy for service discovery packets for all the services supported within the NDL group, while also forwarding the data associated with the services supported within the particular NDL group 172, 174, 176. Therefore each NDL may comprise a plurality of STAs that consume and/or proxy one or more of the NDL's services.

The NDL groups 172, 174, 176 within the cluster 170 (or the wireless network 100) may support various services (e.g., the NDL groups may contain wireless devices 130 providing a service), and multiple services may be supported within each of the NDL groups. For example, the applications 180a, 180b may be provided within the NDL group 172, the applications 180c-180e may be provided within NDL group 174, and the application 180f may be provided within NDL group 176. Further, some of the devices within the cluster 170 may be members of more than one NDL group. For example, the devices within the dotted portion 173 may be members of both NDL group 172 and NDL group 174, and the devices within the dotted portion 175 may be members of both NDL group 174 and NDL group 176. Accordingly, these devices may provide or receive services from more than one NDL group 172, 174, 176.

The NDL groups 172, 174, 176 may be formed through spontaneous group formation, out of band group formation, or some other method. In spontaneous group formation, an NDL group 172, 174, 176 may be formed at the start of an instance of a service (e.g., application 180f). The scope of the NDL group (e.g., NDL group 176) may be limited in scope to the cluster 170, and may not exist outside of the cluster 170. Security pass phrases for NDL groups 172, 174, 176 formed through spontaneous group formation may be created or programmed by applications running on or utilizing a mobile device within the NDL group 172, 174, 176 at the time of instantiation of the NDL group 172, 174, 176. These security pass phrases may be passed to the NAN MAC at this time. However, the NDL groups 172, 174, 176 formed via spontaneous group formation may not provide layer 2 security, which may be desired. Accordingly, in some embodiments, out of band (OOB) group formation may be utilized to form NDL groups 172, 174, 176.

In OOB group formation, NDL groups 172, 174, 176 may be formed outside of the scope of the cluster 170. Each of these NDL groups 172, 174, 176 may have a group name that maps to a group identifier. For example only, NDL group 174 may consist of high school students interested in a game, and may be named or associated with an identifier accordingly. Keys or passphrases for joining the group may be shared in the OOB procedure. In some embodiments, all, or at least some portion, of the NDL groups 172, 174, 176 may be formed in accordance with different methods. For example only, NDL group 172 may be formed through spontaneous group formation, NDL group 174 may be formed through OOB group formation, and NDL group 176 may be formed though some other procedure known in the art.

Each of the NDL group 172, 174, 176 may also part of the same security group. A group of STAs that can mutually authenticate each other may be referred to as a security group. In this instance, no two STAs would exists within the security group unless they could authenticate each other. The security group may be time and channel independent. The formation of the security group may also be OOB and the method of creation may be out of the scope of the cluster 170. In one exemplary embodiment, a security group may be formed through the use of an application running on or utilizing the mobile devices that are members of an NDL group (e.g., NDL group 174). In one embodiment, NDL groups 172, 174, 176 utilize a single logical channel and all subscribing members thereof are part of the same security group. In accordance with this embodiment, an NDL group 172, 174, 176 may have a common group key derived from the credentials of the security group. This group key may be used by the mobile devices within the NDL group 172, 174, 176 to encrypt a portion of the communications that are broadcast or multicast to other members of the NDL group 172, 174, 176.

Each NDL group 172, 174, 176 may have a unique identifier associated therewith. In one embodiment, the unique identifier is an 802.11 MAC address. This MAC address may be referred to herein as an NDL group MAC address, or a MAC address for a group of wireless devices. This NDL group MAC address may be generated through various methods. In one embodiment, the NDL group MAC address is generated by the service initiator device (discussed above) at the time a service provided on the NDL group is initiated. In some aspects, this NDL group MAC address may be generated by taking a variety of factors into account. In an exemplary embodiment, the NDL group MAC address is generated, at least in part, based upon one or more of a MAC address of the service initiator device, an identifier of a service provided by the wireless device within the NDL group, an identifier of a NAN cluster comprising the NDL group, and an indication of a time at which the NDL group is formed. Whatever method of generation is used, this NDL group MAC address may be used in communications that are transmitted between devices of the NDL group (e.g., NDL group 174). In some embodiments, this NDL group MAC address is transmitted in the Address 1 field or the Address 3 field of an 802.11 MPDU. The Address 1 field or the Address 3 field may be used for this purpose instead of identifying a receiver address or a basic service set identification (BSSID), respectively.

These communications may contain data that is intended for wireless devices of the NDL group. In some aspects, the devices within the NDL group may wish to encrypt this data so that only members of the NDL group (e.g., NDL group 172) may decrypt and read the data. As described above, a wireless device may obtain security keys for each NDL group that it is a member of. Accordingly, the wireless device may have access to multiple security keys if it is a member of more than one NDL group (e.g., the wireless devices in dotted portion 173). Therefore, the wireless device must know which security key is associated with each NDL group in order to effectively decrypt the encrypted data portion of the communication. In one exemplary embodiment, the wireless device may use the NDL group MAC address to identify the proper security key for the communication. In some embodiments, the wireless device may also use the MAC address of the wireless device transmitting the communication to identify the proper security key. Accordingly, in some aspects, the MAC address of the transmitting device may be provided in the transmitted communication. The format of this communication is described in more detail below with respect to FIG. 4.

Figure 4:
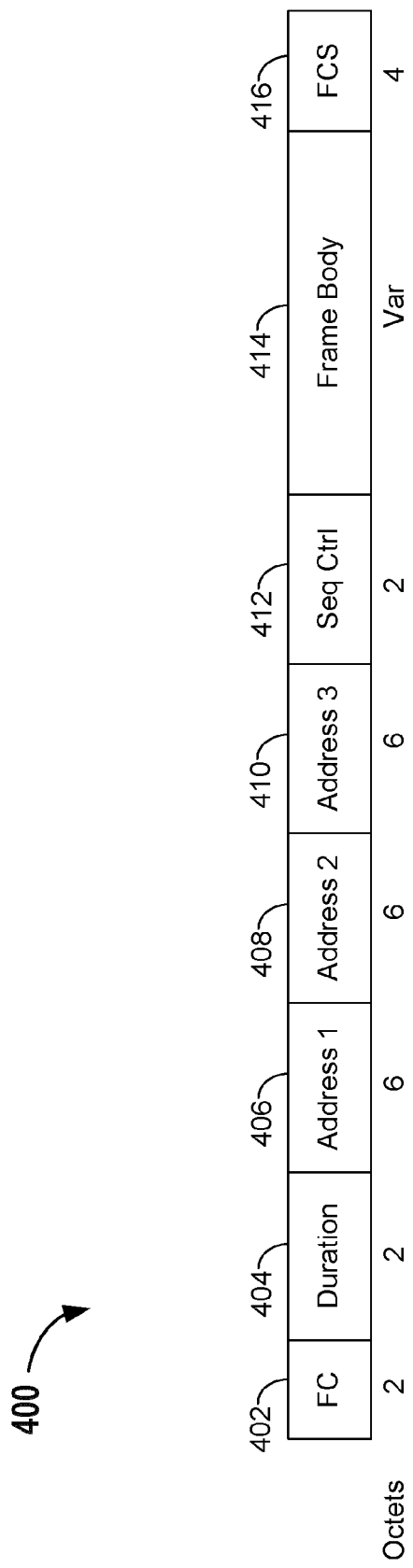
FIG. 4 illustrates an exemplary neighbor aware network frame format of a communication, according to the disclosure.

FIG. 4 depicts a NAN frame format of a communication 400 according to an embodiment. The NAN frame format of the communication 400 may comprise certain standard frames such as a frame check ("FC") field 402, a duration field 404, an address 1 field 406, and address 2 field 408, an address 3 field 410, a sequence control field 412, the frame body 414, and a frame check sequence ("FCS") field 416.

The communication 400 may comprise or otherwise be a portion of an 802.11 MPDU. The communication 400 may be sent among STAs of an NDL group as described above. Notably, the address 1 field 406 may comprise the MAC address of the STA or NDL group that is the intended recipient of the communication 400, the address 2 field 408 may comprise the MAC address of the STA that is transmitting, broadcasting, or multicasting the communication 400 or the MAC address of the STA that is previously transmitted, broadcasted, or multicasted information contained in the communication 400, and the address 3 field 410 may comprise the NDL group MAC address, a BSSID, a source address, or destination address. In some aspects, the address 3 field 410 may not be present. The NDL group MAC address may be generated in accordance with the methods described herein. Further, the frame body 414 may comprise data that is intended for the STA indicated by the address 1 field 406, and the data may encrypted. Similar to the methods described above, a STA receiving the communication 400 may use one or more of the address 1 field 406, the address 2 field 408, or the address 3 field 410, in order to determine what security key to use to decrypt the data contained in the frame body 414.

Figure 5:
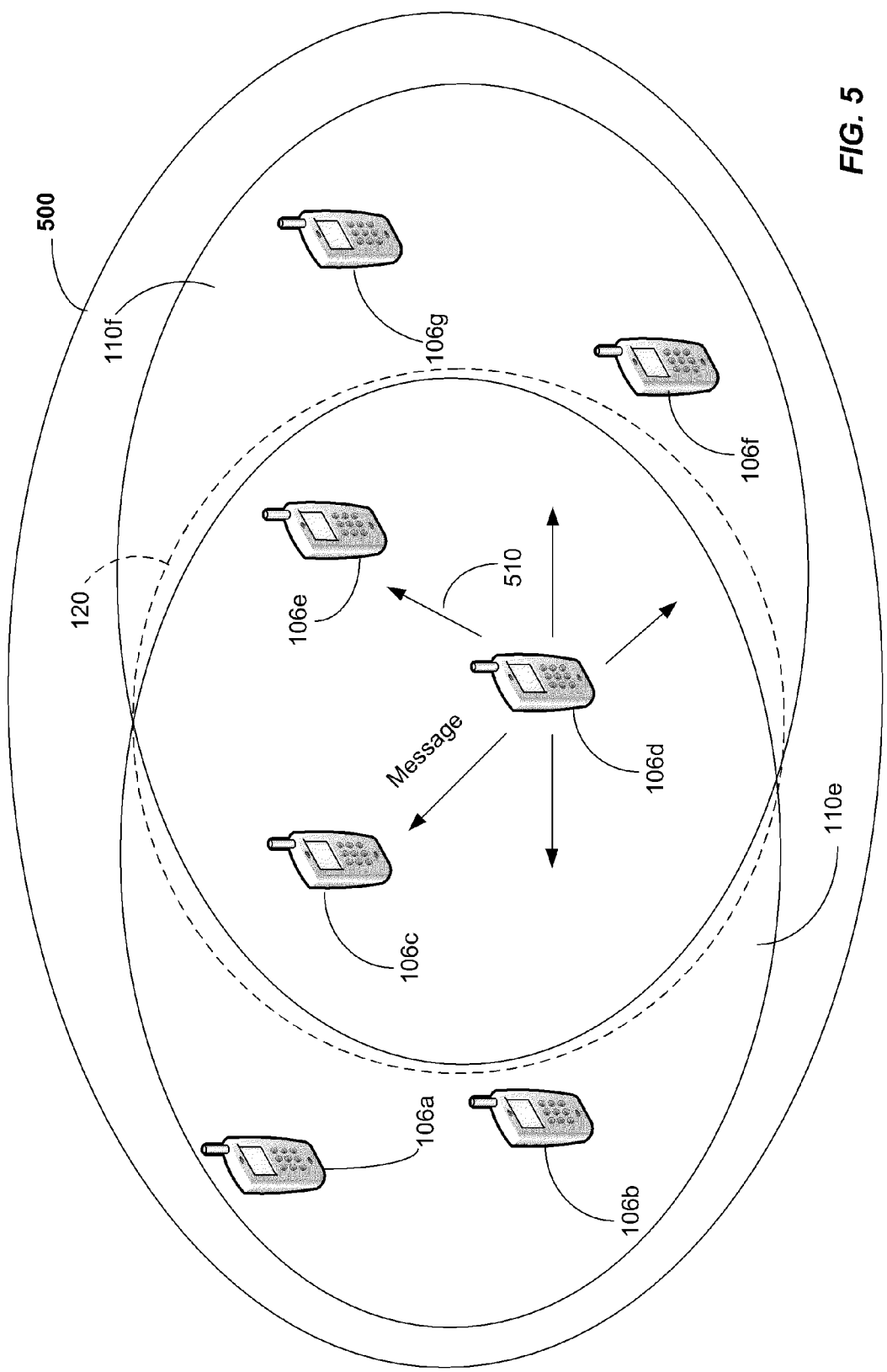
FIG. 5 illustrates an exemplary embodiment of a communications system, according to the disclosure.

FIG. 5 shows an exemplary embodiment of a communication system 500. The communication system 500 may be similar to the wireless network 100 of FIG. 1 or the cluster 170 of FIG. 3. FIG. 5 shows two NDL groups 110e and 110f. As illustrated, NDL group 110e includes wireless devices 106a-e and NDL group 110f includes wireless devices 106c-f. As depicted by the dotted portion 120, wireless devices 106c-d are members of both NDL groups 110e and 110f. Accordingly, each of the wireless devices 106c-e may have access to at least two different security keys (e.g., a security key for communications received from devices within NDL group 110e and a security key for communications received from devices within NDL group 110f). As depicted, 106d may broadcast or multicast a message 510 within the communication system 500. In various aspects, the message 510 may be encrypted. Wireless devices 106c and 106e may receive the message 510, but may not be able to determine which group the message is associated with, as the wireless devices 106c-e are all members of both NDL group 110e and NDL group 110f. Accordingly, wireless device 106d may transmit the message in accordance with the frame format of communication 400 described in connection with FIG. 4 above.

If the message 510 is sent in accordance with the frame format of communication 400, then the wireless devices 106c and 106e may determine which security key to use in order to decrypt the message 510. As a non-limiting example, wireless device 106c may determine the MAC address of 106d, and the NDL group MAC address contained within the message 510, and may determine that it is necessary to use the security key(s) associated with NDL group 110f.

Figure 6:
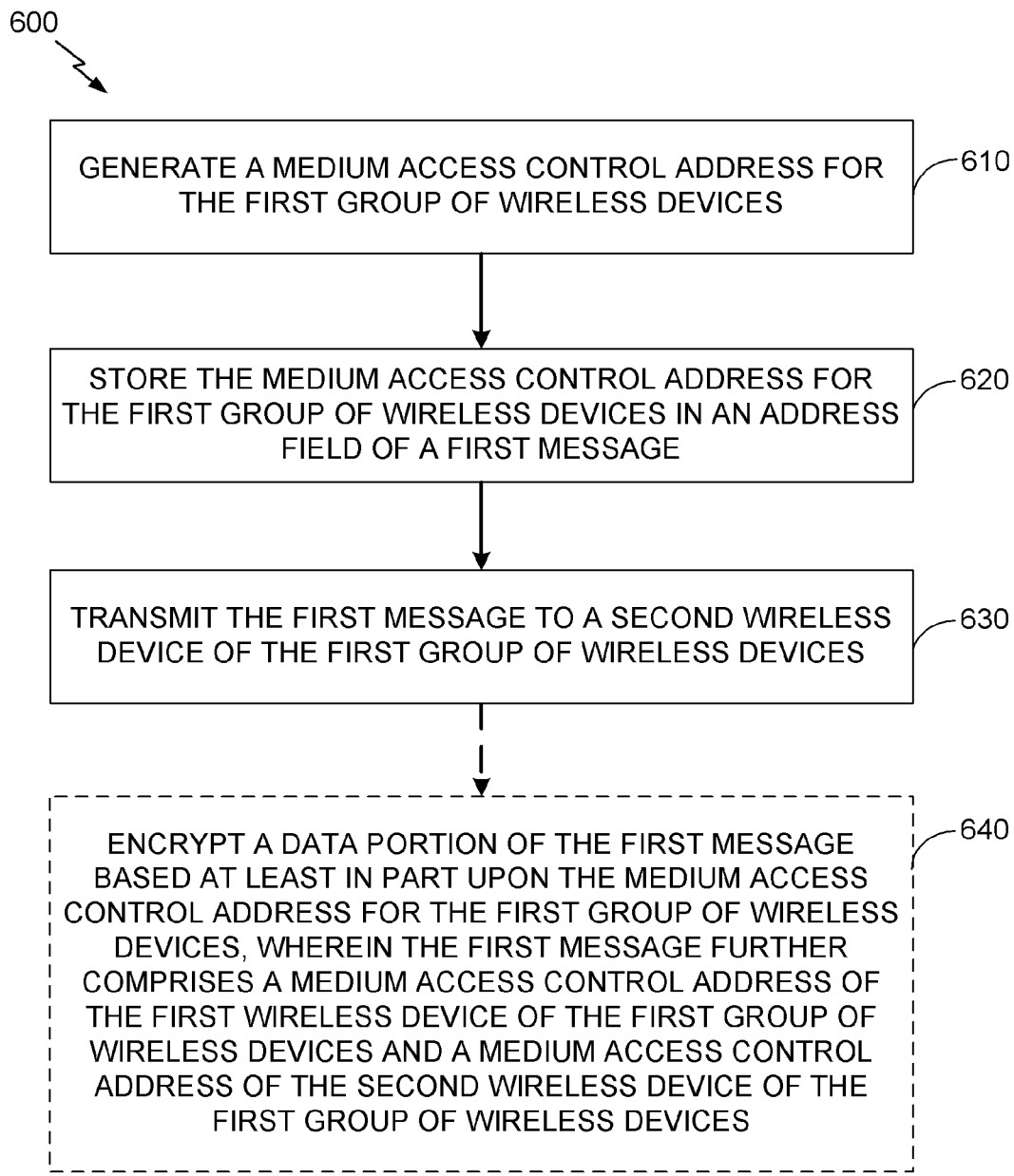
FIG. 6 is a flowchart of an exemplary method of communication within a neighbor aware network, according to the disclosure.

FIG. 6 is a flowchart of an exemplary method 600 of communicating in a wireless network. The method 600 may be performed, in some aspects, by any of wireless devices 130a-1 and/or the wireless device 202. In some aspects, the method 600 may be performed by the wireless device 106d shown in FIG. 5. In some aspects, the method 600 may enable a device (e.g., wireless device 106c of FIG. 5) to receive and decrypt communications intended for member(s) of a NAN data link group. To ensure adequate decryption, the method 600 may utilize an NDL group MAC address.

In block 610 a first wireless device 106c, for example, generates a medium access control (MAC) address for a first group of wireless devices. In some aspects, the wireless device 106c may first identify the first group of wireless devices. In some aspects, the first group of wireless devices identified may be substantially similar to one of the NDL groups 110 described with respect to FIG. 1 or FIG. 5. In various embodiments, the wireless devices are STAs providing or receiving a service provided within the NDL groups 110.

In some aspects, the MAC address for the first group of wireless devices generated in block 610 is generated by a service initiator device or another device or application. In some aspects, the MAC address for the first group of wireless devices is generated based on at least one of a MAC address of a service initiator device, an identifier of a service provided by the first group of wireless devices, an identifier of a cluster of devices comprising the first group of wireless devices and a second group of wireless devices, and an indication of a time at which the first group of wireless devices is formed. In some aspects, the first group of wireless devices comprises a neighbor aware network (NAN) data link (NDL) group including a device providing a service to other devices of the NDL group.

In block 620, the MAC address for the first group of wireless devices is stored in an address field of a first message. In some aspects, the address field of the first message comprises the Address 1 field of an 802.11 MAC protocol data unit (MPDU).

In block 630, the first message is transmitted by a first wireless device of the first group of wireless devices to a second wireless device of the first group of wireless. In some aspects, In block 640, a data portion of the first message is encrypted by the first wireless device of the first group of wireless devices based at least in part upon the MAC address for the first group of wireless devices. As indicated in block 640, the first message further comprises a MAC address of the first wireless device of the first group of wireless devices and a MAC address of the second wireless device of the first group of wireless devices. As indicated by the dashed lines, block 650 may be an optional step of method 600. In some aspects, encrypting the data portion of the first message is based upon a security key derived from credentials of the first group of wireless devices. In some aspects, the NDL group is part of a security group that shares security keys in an out of band procedure. In various aspects, processor 204 of the wireless device 202 may provide the means for encrypting the first message in accordance with the methods described herein.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g., tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of communication in a wireless network, comprising:
   generating a medium access control (MAC) address for a first group of wireless devices, the first group of wireless devices comprising at least a first wireless device and a second wireless device;
   storing the MAC address for the first group of wireless devices in an address field of a first message, the first message further comprising a MAC address of the first wireless device and a MAC address of the second wireless device;
   encrypting, by the first wireless device, a data portion of the first message based at least in part upon the MAC address for the first group of wireless devices and a security key derived from credentials of the first group of wireless devices; and
   transmitting, by the first wireless device, the first message to the second wireless device.

2. The method of claim 1, wherein the MAC address for the first group of wireless devices is generated based on at least one of:
   a MAC address of a service initiator device;
   an identifier of a service provided by the first group of wireless devices;
   an identifier of a cluster of devices comprising the first group of wireless devices and a second group of wireless devices; and
   an indication of a time at which the first group of wireless devices is formed.

3. The method of claim 1, wherein the first group of wireless devices comprises a neighbor aware network (NAN) data link (NDL) group including a device providing a service to other devices of the NDL group.

4. The method of claim 3, wherein the NDL group is part of a security group that shares security keys in an out of band procedure.

5. The method of claim 1, wherein the address field of the first message comprises the Address 1 field of an 802.11 MAC protocol data unit (MPDU).

6. A first wireless device for communicating in a wireless network, comprising:
   a processor configured to:
      generate a medium access control (MAC) address for a first group of wireless devices, the first wireless device and a second wireless device being part of the first group of wireless devices, store the MAC address for the first group of wireless devices in an address field of a first message, the first message further comprising a MAC address of the first wireless device and a MAC address of the second wireless device, and encrypt a data portion of the first message based at least in part upon the MAC address for the first group of wireless devices and a security key derived from credentials of the first group of wireless devices; and a transmitter configured to transmit the first message to the second wireless device.

7. The first wireless device of claim 6, wherein the processor is configured to generate the MAC address for the first group of wireless devices based on at least one of:
a MAC address of a service initiator device;
an identifier of a service provided by the first group of wireless devices;
an identifier of a cluster of devices comprising the first group of wireless devices and a second group of wireless devices; and
an indication of a time at which the first group of wireless devices is formed.

8. The first wireless device of claim 6, wherein the first group of wireless devices comprises a neighbor aware network (NAN) data link (NDL) group including a device providing a service to other devices of the NDL group.

9. The first wireless device of claim 8, wherein the NDL group is part of a security group that shares security keys in an out of band procedure.

10. The first wireless device of claim 6, wherein the address field of the first message comprises the Address 1 field of an 802.11 MAC protocol data unit (MPDU).

11. A non-transitory computer readable storage medium comprising instructions that when executed cause a processor to perform a method of communication in a wireless network, comprising:
generating a medium access control (MAC) address for a first group of wireless devices, the first group of wireless devices comprising at least a first wireless device and a second wireless device;
storing the MAC address for the first group of wireless devices in an address field of a first message, the first message further comprising a MAC address of the first wireless device and a MAC address of the second wireless device;
encrypting a data portion of the first message based at least in part upon the MAC address for the first group of wireless devices and a security key derived from credentials of the first group of wireless devices; and
transmitting the first message to the second wireless device.

12. The non-transitory computer readable storage medium of claim 11, wherein the MAC address for the first group of wireless devices is generated based on at least one of:
a MAC address of a service initiator device;
an identifier of a service provided by the first group of wireless devices;
an identifier of a cluster of devices comprising the first group of wireless devices and a second group of wireless devices; and
an indication of a time at which the first group of wireless devices is formed.

13. The non-transitory computer readable storage medium of claim 11, wherein the first group of wireless devices comprises a neighbor aware network (NAN) data link (NDL) group including a device providing a service to other devices of the NDL group.

14. The non-transitory computer readable storage medium of claim 13, wherein the NDL group is part of a security group that shares security keys in an out of band procedure.

15. The non-transitory computer readable storage medium of claim 11, wherein the address field of the first message comprises the Address 1 field of an 802.11 MAC protocol data unit (MPDU).

16. A first wireless device for communicating in a wireless network, comprising:
means for generating a medium access control (MAC) address for a first group of wireless devices, the first wireless device and a second wireless device being part of the first group of wireless devices;
means for storing the MAC address for the first group of wireless devices in an address field of a first message, the first message further comprising a MAC address of the first wireless device and a MAC address of the second wireless device;
means for encrypting a data portion of the first message based at least in part upon the MAC address for the first group of wireless devices and a security key derived from credentials of the first group of wireless devices; and
means for transmitting the first message to the second wireless device.

17. The first wireless device of claim 16, wherein the means for generating the MAC address for the first group of wireless devices comprises generating the MAC address for the first group of wireless devices based on at least one of:
a MAC address of a service initiator device;
an identifier of a service provided by the first group of wireless devices;
an identifier of a cluster of devices comprising the first group of wireless devices and a second group of wireless devices; and
an indication of a time at which the first group of wireless devices is formed.

18. The first wireless device of claim 16, wherein the first group of wireless devices comprises a neighbor aware network (NAN) data link (NDL) group including a device providing a service to other devices of the NDL group.

19. The first wireless device of claim 18, wherein the NDL group is part of a security group that shares security keys in an out of band procedure.

20. The first wireless device of claim 16, wherein the address field of the first message comprises the Address 1 field of an 802.11 MAC protocol data unit (MPDU).

* * * * *